United States Patent [19]
Iijima et al.

[11] Patent Number: 5,666,563
[45] Date of Patent: Sep. 9, 1997

[54] CAMERA HAVING HAND TREMOR CORRECTION MECHANISM

[75] Inventors: Shuji Iijima, Yokohama; Hidenori Miyamoto, Urayasu; Isao Soshi, Tokyo; Minoru Kato; Junichi Omi, both of Kawasaki; Hiroshi Wakabayashi, Yokohama, all of Japan

[73] Assignee: Nikon Corporation, Tokyo, Japan

[21] Appl. No.: 273,838

[22] Filed: Jul. 12, 1994

[30] Foreign Application Priority Data

Jul. 12, 1993 [JP] Japan ................... 5-171851
Aug. 26, 1993 [JP] Japan ................... 5-234150

[51] Int. Cl.⁶ ........................................ G03B 5/00
[52] U.S. Cl. ........................... 396/53; 396/542
[58] Field of Search .................. 354/75, 76, 400, 354/430, 70, 202, 485; 396/52–55, 133, 301, 542, 535; 348/118–120, 208; 359/819, 825, 694

[56] References Cited

U.S. PATENT DOCUMENTS

| | | | |
|---|---|---|---|
| 4,681,421 | 7/1987 | Yamada et al. | 354/485 |
| 4,711,548 | 12/1987 | Arakawa et al. | 354/485 |
| 4,864,348 | 9/1989 | Fujiwara et al. | 396/542 |
| 5,012,273 | 4/1991 | Nakamura et al. | 354/485 |
| 5,051,764 | 9/1991 | Nomura | 396/542 |
| 5,231,445 | 7/1993 | Onuki et al. | 354/410 |
| 5,416,557 | 5/1995 | Nagasaki et al. | 354/430 |
| 5,416,558 | 5/1995 | Katayama et al. | 354/446 |

OTHER PUBLICATIONS

Abstract of Japanese Publication No. JP-3-110530 dated May 5, 1991.

*Primary Examiner*—D. Rutledge

[57] ABSTRACT

A camera having a hand tremor correction mechanism with improved positioning of the hand tremor correction mechanism. The camera includes a photographic lens which moves along the optical axis of the photographic optical system. A vibration detection unit detects camera vibration, such as from hand tremor, and produces a corresponding output signal. A vibration correction mechanism, coupled to the external periphery of the photographic lens and electrically connected to the vibration detection unit via a flexible printed circuit board, receives the output signal of the vibration detection unit and compensates for the vibration detected by the vibration detection unit. The camera can also have a vibration correction mechanism which is coupled to the external periphery of the photographic lens and which shifts the photographic lens to compensate for the effects of vibration, the vibration correction mechanism having a thickness or width in the optical axis direction which is less than or equal to the thickness or width of the photographic lens in the optical axis direction.

11 Claims, 11 Drawing Sheets

CAMERA HAVING HAND TREMOR CORRECTION MECHANISM

BACKGROUND OF THE INVENTION

1. Field of the Invention

The present invention relates to vibration correction mechanisms in cameras, such as camera hand tremor correction mechanisms, and, more particularly, to improved positioning within the camera of a hand tremor correction mechanism.

2. Description of the Related Art

Conventional cameras are equipped with hand tremor correction mechanisms; however, conventional hand tremor correction mechanisms require a large lens barrel to hold various components of the hand tremor correction mechanism, thereby increasing camera size and cost. Also, conventional hand tremor correction mechanisms hinder the movement along the optical axis of photographic lenses within the photographic lens barrel.

SUMMARY OF THE INVENTION

Accordingly, it is an object of the present invention to reduce the size of the lens barrel of a camera having a hand tremor correction mechanism.

It is an additional object of the present invention to allow greater movement along the optical axis of photographic lenses within a photographic lens barrel for a camera having a hand tremor correction mechanism.

It is an additional object of the present invention to arrange the thickness or width in the optical axis direction of the vibration correcting lens and corresponding vibration correcting lens drive mechanism so that the length of the lens barrel is reduced.

Additional objects and advantages of the invention will be set forth in part in the description which follows and, in part, will be obvious from the description, or may be learned by practice of the invention.

Objects of the present invention are achieved by providing a camera, having an optical axis, comprising a camera body, a photographic lens which has an external periphery and moves along the optical axis, a flexible printed circuit board, and a vibration detection unit which is fixed to the camera body, detects vibration and produces a corresponding output signal. A vibration correction mechanism, coupled to the external periphery of the photographic lens and electrically connected to the vibration detection unit via the flexible printed circuit board, receives the output signal of the vibration detection unit via the flexible printed circuit board and compensates for the vibration detected by the vibration detection unit.

Objects of the present invention are also achieved by providing a camera which compensates for the effects of vibration and comprises a photographic lens having an external periphery and a thickness, or width, in the optical axis direction. The camera also includes a vibration correction mechanism which is coupled to the external periphery of the photographic lens and shifts the photographic lens to compensate for the effects of vibration, the vibration correction mechanism having a thickness in the optical axis direction which is less than or equal to the thickness of the photographic lens in the optical axis direction.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
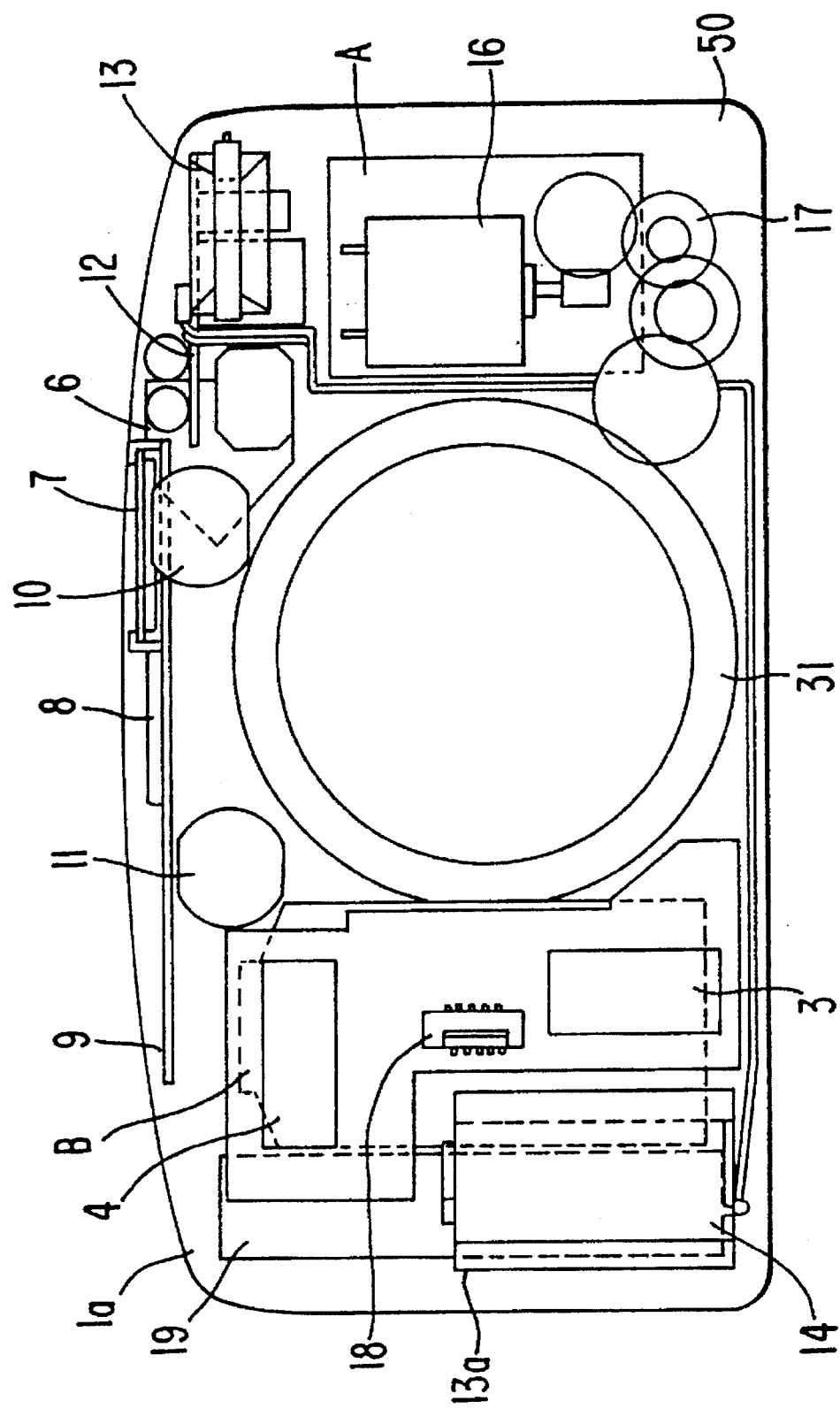
FIG. 1 is a front view of a camera having a hand tremor correction mechanism according to an embodiment of the present invention.

Reference will now be made in detail to the present preferred embodiments of the present invention, examples of which are illustrated in the accompanying drawings, wherein like reference numerals refer to like elements throughout.

In accordance with a preferred embodiment of the invention, a camera is provided having a vibration correction mechanism for an optical system therein. As shown in FIG. 1, a camera body 50 has a photographic lens barrel 31 attached to a central portion of camera body 50. A grip portion 1a of camera body 50, shaped to be easily held by a photographer, is disposed on the left-hand side of camera body 50, as seen from the front (the photographic lens side) of the camera. Grip portion 1a has a cartridge compartment B to receive a film cartridge (not illustrated). A battery 14 is located in a position formed as the most convex portion of the front side of the cartridge compartment B. A battery 13a is located at the rear of battery 14 and the outer side of cartridge compartment B such that the length of camera body 50 in the transverse direction is relatively small. A strobe capacitor 19 is located at the rear of battery 13a. A CPU 8 controls photographic functions.

A spool compartment A holds a spool 20 (see FIG. 2) and is disposed on the right-hand side of camera body 50 seen from the front (the photographic lens side) of the camera. Spool 20 has a built-in film forwarding motor (not illustrated). Photographic lens barrel 31 and a drive motor 16 are located at the front side of spool compartment A. A drive gear unit 17 is located on the lower side of photographic lens barrel 31 and drive motor 16. Moreover, a strobe generating unit 13 is located above photographic lens barrel 31, drive motor 16 and spool compartment A. A strobe circuit 12 is located near the top of the camera and close to a viewfinder device 6 to the rear of strobe generating unit 13.

Angular acceleration detecting sensors 4 and 3 are anti-vibration sensors which operate as a vibration detection unit, such as a hand tremor detection mechanism, to detect vibration in the pitch and yaw directions, respectively. Angular acceleration detecting sensor 3 detects the amount of vibration in the yaw direction and angular acceleration detecting sensor 4 detects the amount of vibration in the pitch direction. An infrared light projecting device 10 and an infrared light receiving device 11 function as a rangefinding device. A main board 9 is positioned near the top of the camera and is used to hold various camera components. A flexible connector 18 is also illustrated and will be described later. CPU 8 controls photography and film winding. LCD device 7 is an external display that is connected to main board 9. A viewfinder device 6 includes an objective lens (not illustrated) and an ocular lens 6b (see FIG. 2).

Figure 2:
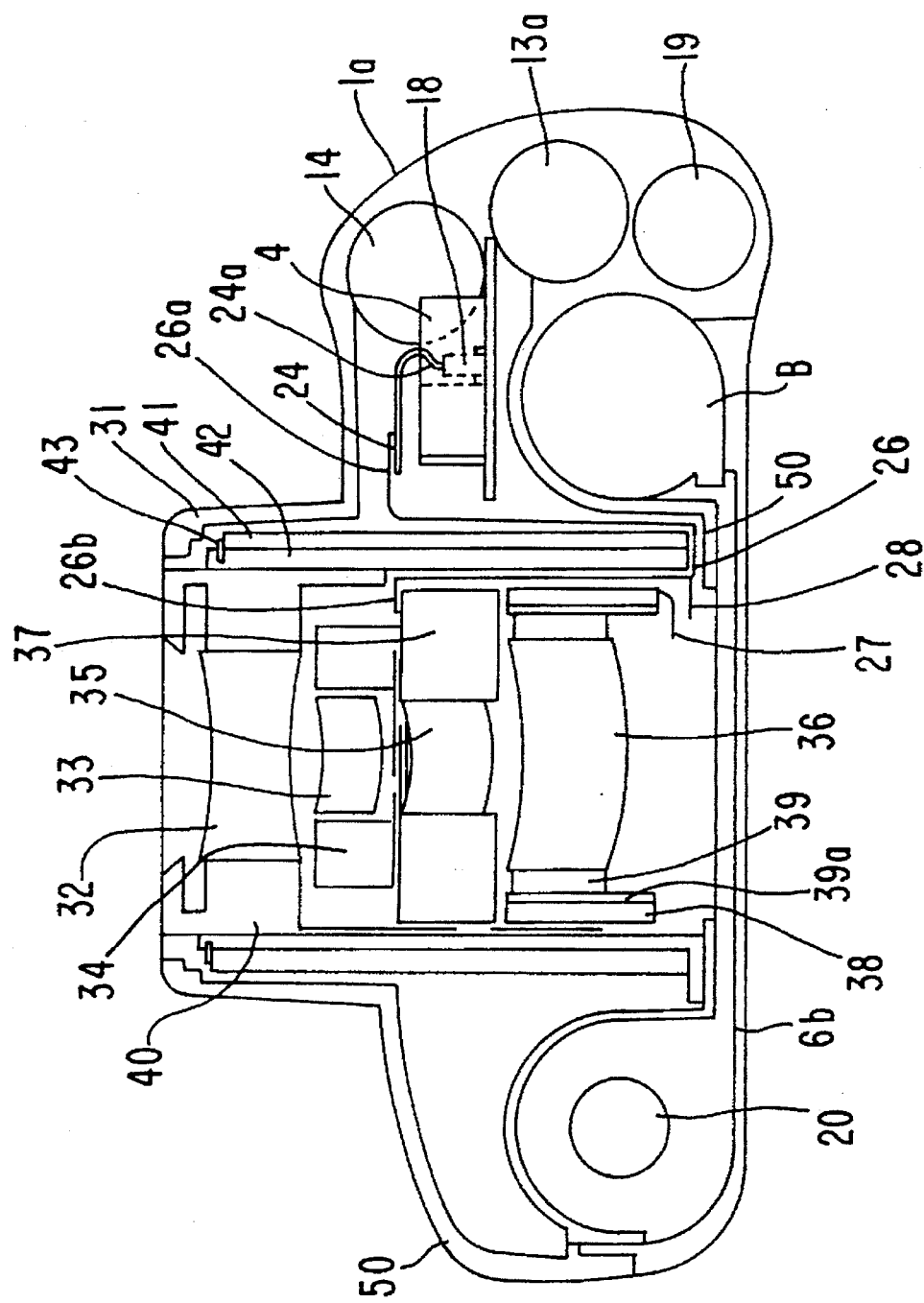
FIG. 2 is a top view of a camera having a hand tremor correction mechanism according to an embodiment of the present invention.

FIG. 2 illustrates a photographic optical system which includes photographic lens groups 32, 33, 35 and 36. Photographic lens group 35 (hereinafter referred to as "correcting lens 35") functions an a correcting lens which is shifted to correct for the effects of vibration, such as from hand tremor. Lens support tube 40 supports photographic lens group 32. Lens support frame 39 supports photographic lens group 36. Lens support frame 38 is also illustrated. An anti-vibration lens drive mechanism 37 operates as a hand tremor correction mechanism or vibration correction mechanism and is positioned on, or "coupled to", the external circumference of correcting lens 35. Anti-vibration lens drive mechanism 37 is formed integrally with a shutter drive mechanism 34. FIG. 2 also illustrates a straight guide tube 42 and a cam tube 41. Ring 43 prevents cam tube 41 from being removed off of guide tube 42.

A flexible printed circuit board 26 electrically connects angular acceleration detection sensors 3 and 4 to anti-vibration lens drive mechanism 37. Angular acceleration detection sensors 3 and 4 are connected to anti-vibration lens drive mechanism 37 at point 26b via flexible printed circuit board 26. Flexible printed circuit board 26 forms deflection portions 260 (see FIG. 4). As shown in FIG. 2, flexible printed circuit board 26 extends from the exterior of the rear ends of guide tube 42 and cam tube 41, through the interior of photographic lens barrel 31 on the side surface of angular acceleration detection sensors 3 and 4, and connects at point 26a to a main flexible printed circuit board 24, such as by a solder bridge or pressure welding. FIG. 2 also illustrates helicoid 39a.

Figure 3:
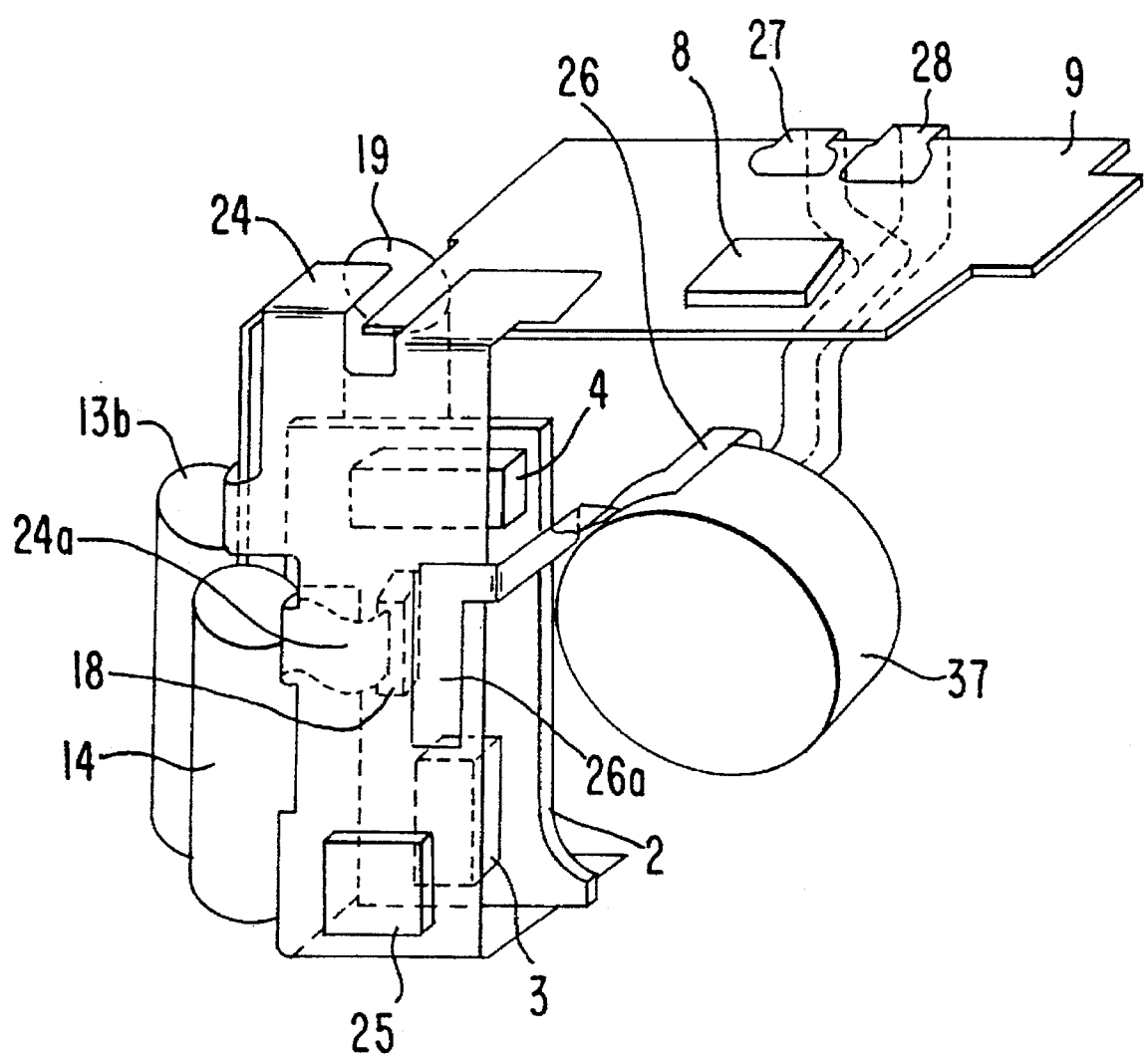
FIG. 3 is an oblique view of a camera having a hand tremor correction mechanism according to an embodiment of the present invention.

As shown in FIG. 3, a perpendicular type flexible connector 18 is soldered to an anti-vibration sensor board 2 (which mounts angular acceleration detection sensors 3 and 4) and electrically connects anti-vibration sensor board 2 and main flexible printed circuit board 24. A CPU circuit 25 controls the anti-vibration function and is mounted on main flexible printed circuit board 24. A convex portion 24a of main flexible printed circuit board 24 is plugged into flexible connector 18 and electrically connects CPU circuit 25 and flexible connector 18.

Also, to effectively use the restricted internal space of grip portion 1a, angular acceleration detection sensor 3 is located in a space between battery 14 and photographic lens barrel 31. Angular acceleration detection sensor 4 is located in a space above battery 14 and angular acceleration detection sensor 3. Angular acceleration detection sensors 3 and 4 are mounted together on a single anti-vibration sensor board 2. FIG. 3 also illustrates flexible printed circuit boards 27 and 28.

Figure 4:
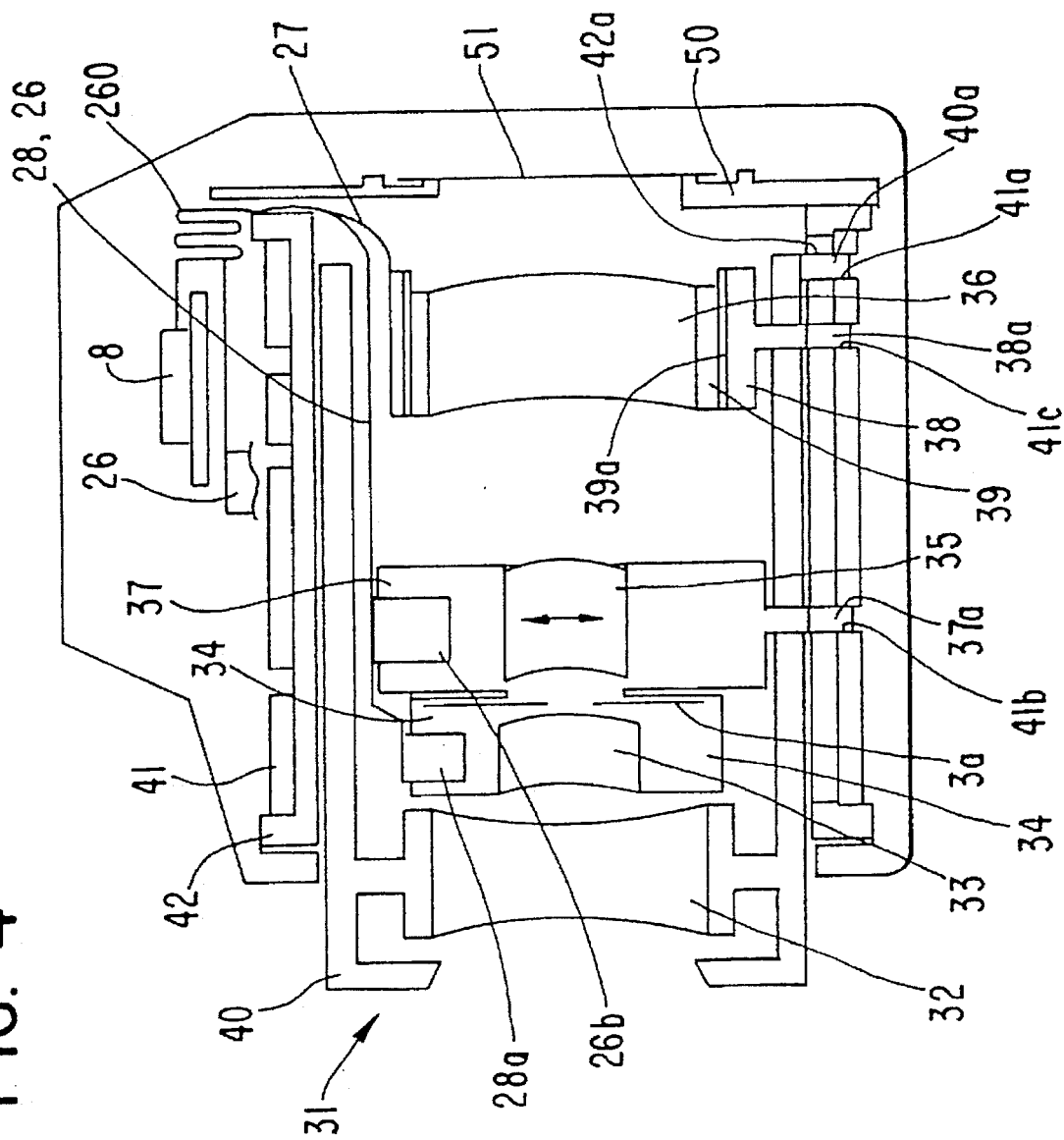
FIG. 4 is a longitudinal cross-sectional view of a camera having a hand tremor correction mechanism according to an embodiment of the present invention.

As shown in FIG. 4, photographic lens barrel 31 includes photographic lens groups 32, 33, 36 and correcting lens 35. Shutter drive mechanism 34 is mounted to photographic lens group 35. Correcting lens 35 is driven by anti-vibration lens drive mechanism 37 in accordance with signals from angular acceleration detection sensors 3 and 4. Infrared light projecting device 10 and infrared light receiving device 11, used for autofocusing, are located at the upper side of photographic lens barrel 31.

Photographic lens barrel 31 is connected to main board 9 via flexible printed circuit board 28. Flexible printed circuit board 28 is used to control shutter sector 3a and connects CPU 8 to shutter sector 3a. Flexible printed circuit board 27 is used to control focus and connects CPU 8 to photographic lens group 36. Flexible printed circuit board 26 is connected to main flexible printed circuit board 24 (see FIG. 2) and is used to control anti-vibration functions. Deflection portions 260 represent deflection portions of flexible circuit boards 26, 27 and 28 as flexible printed circuit boards 26, 27 and 28 connect to CPU 8.

In FIG. 4, correcting lens 35 is movable in a direction perpendicular with respect to the optical axis of the photographic optical system. Shutter drive mechanism 34 drives shutter sector 3a based on aperture diameter and open aperture time signals received from CPU circuit 8 and signals from a photometric mechanism (not illustrated). Anti-vibration lens drive mechanism 37 receives anti-vibration lens drive direction signals from CPU 8 and, based on signals from angular acceleration detection sensors 3 and 4, drives correcting lens 35 in a direction perpendicular to the optical axis.

Flexible printed circuit boards 27 and 28 are used to connect shutter drive mechanism 34 and a focusing control mechanism (not illustrated) to CPU 8, respectively, and to transmit signals from CPU 8 to shutter drive mechanism 34 and the focusing control mechanism, respectively. CPU 8 controls the actions of camera body 50. The surface 51 of film is also illustrated.

Figure 5:
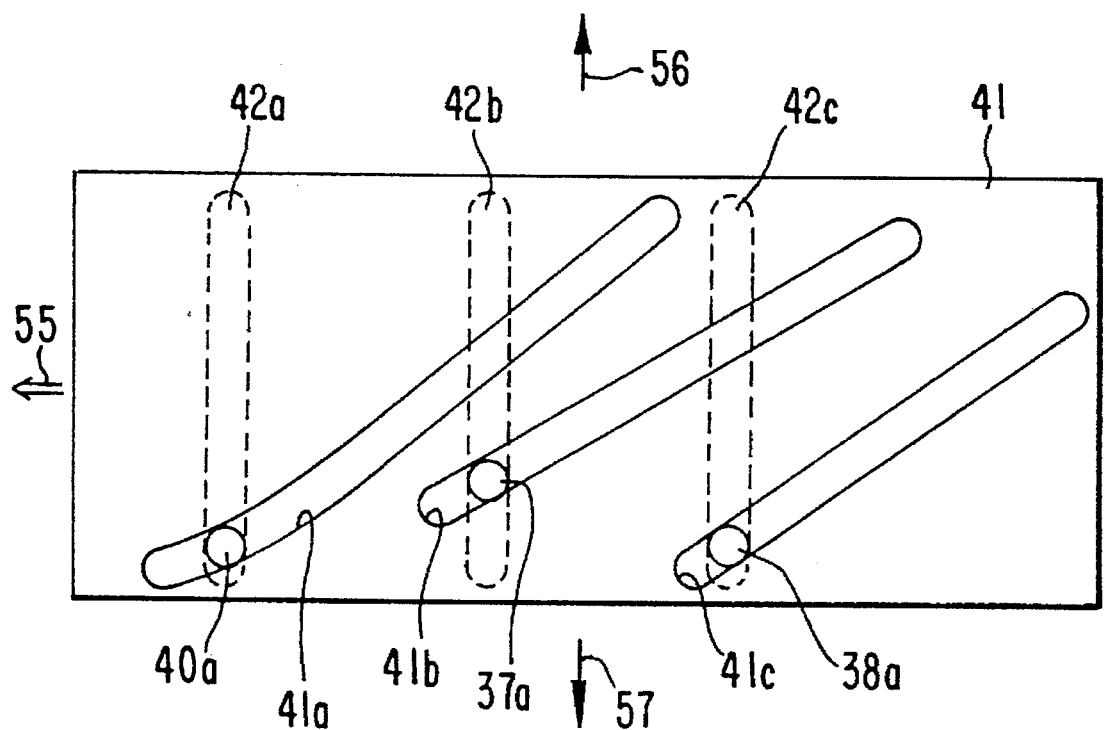
FIG. 5 is a diagram illustrating the cooperation of components in a lens barrel to allow the lens barrel to extend and retract, according to an embodiment of the present invention.

As illustrated in FIG. 4 and FIG. 5, cam tube 41 is rotatably supported on guide tube 42 centered on the optical axis of the photographic optical system. Cam tube 41 has cam grooves 41a, 41b and 41c to determine the position of photographic lens groups 32, 33, 36 and correcting lens 35. Guide tube 42 has rectilinear grooves 42a–42c in order to rectilinearly change the relative positions of photographic lens groups 32, 33, 36, and correcting lens 35, without rotation, when the focal length of the photographic optical system changes. Guide tube 42 is fixed to camera body 50.

Photographic lens barrel 31 is extended and retracted via the interaction of cam pins 40a, 37a and 38a, cam grooves 41a, 41b and 41c and rectilinear grooves 42a, 42b and 42c. Cam pin 40a is disposed on lens support tube 40 and cooperates with rectilinear groove 42a (see FIG. 5) of guide tube 42 and cam groove 41a of a cam tube 41. Cam pin 37a, disposed on the external circumferential portion of anti-vibration drive mechanism 37, cooperates with cam groove 41b and rectilinear groove 42b (see FIG. 5). Cam pin 38a is disposed on the external circumferential portion of lens support frame 38 and cooperates with cam groove 41c and rectilinear groove 42c. A helicoid 39a is formed on the external circumference of lens support frame 39. The helicoid 39a and cam pin 38a are fitted together and cam tube 41 is rotationally driven by a drive mechanism (not illustrated) based on rangefinding signals in order to perform focusing movements. When cam tube 41 is rotated, photographic lens barrel 31 is extended or retracted in a direction corresponding to the direction of rotation of cam tube 41.

Referring now to FIG. 5, cam tube 41 moves in the direction of arrow 55 when cam tube 41 rotates. Accompanying the rotation of cam tube 41, cam grooves 41a–41c rotate and cam pins 40a, 37a, and 38a cooperate with cam grooves 41a–41c to move in the direction of the optical axis, as shown by arrows 56 and 57. Therefore, when cam tube 41 is rotated, photographic lens groups 32, 33, 36 and correcting lens 35 move along cam grooves 41a–41c, the intervals between photographic lens groups 32, 33, 36 and correcting lens 35 change, and the focal length can be changed.

Figure 6:
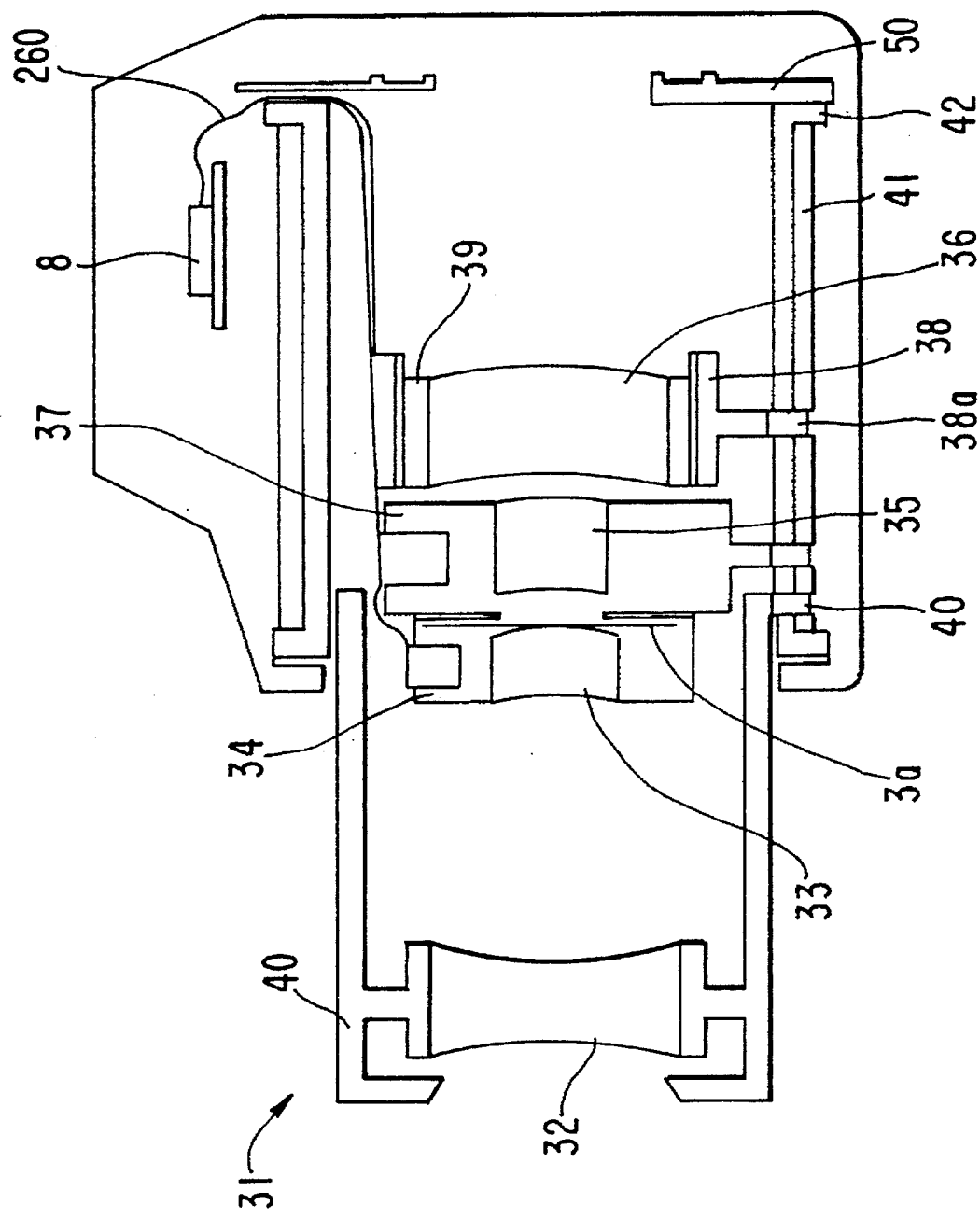
FIG. 6 is a cross sectional view showing a lens barrel of a camera having a hand tremor correction mechanism according to an embodiment of the present invention, the lens barrel being in a telephoto angle position.

FIG. 6 is a cross sectional view showing a lens barrel of a camera having a hand tremor correction mechanism according to an embodiment of the present invention, the lens barrel being in a telephoto angle position.

FIGS. 4 and 6 can be contrasted to describe the effect of the extension and retraction of photographic lens barrel 31 on flexible printed circuit board 26. In FIG. 4, photographic lens barrel 31 is retracted (wide angle position), thereby causing a retraction of flexible printed circuit board 26. Therefore, deflection portions 260 in FIG. 4 are in a relatively "folded" position. By contrast, in FIG. 6, photographic lens barrel 31 is extended (telephoto position), thereby causing an extension of flexible printed circuit board 26. Therefore, deflection portions 260 in FIG. 6 are in a relatively "flat" position.

According to the preferred embodiment of the present invention, the hand tremor correction mechanism can be located on the external circumference of any of the photographic lens groups which perform a displacement action. Also, since a flexible printed circuit board connects the hand tremor detecting mechanism and the hand tremor correction mechanism, a hand tremor correcting lens group can be realized which is within the lens barrel and is capable of movement in the direction of the optical axis during zooming. Also, the use of a flexible printed circuit board to connect the hand tremor detecting mechanism and the hand tremor correction mechanism allows the hand tremor correction mechanism to be located on the external circumference of a photographic lens group which performs a displacement action and has a small diameter, as compared to the other photographic lens groups in the photographic optical system. As a result it becomes possible to reduce the diameter of the lens barrel.

The above embodiment of the present invention describes a camera equipped with a photographic lens group which performs a displacement action in the direction of the optical axis and hand tremor detecting mechanism fixed to the camera body. The hand tremor correction mechanism performs hand tremor correction based on detection signals from the hand tremor detecting mechanism. A flexible printed circuit board connects the hand tremor detecting mechanism and the hand tremor correction mechanism.

Figure 7:
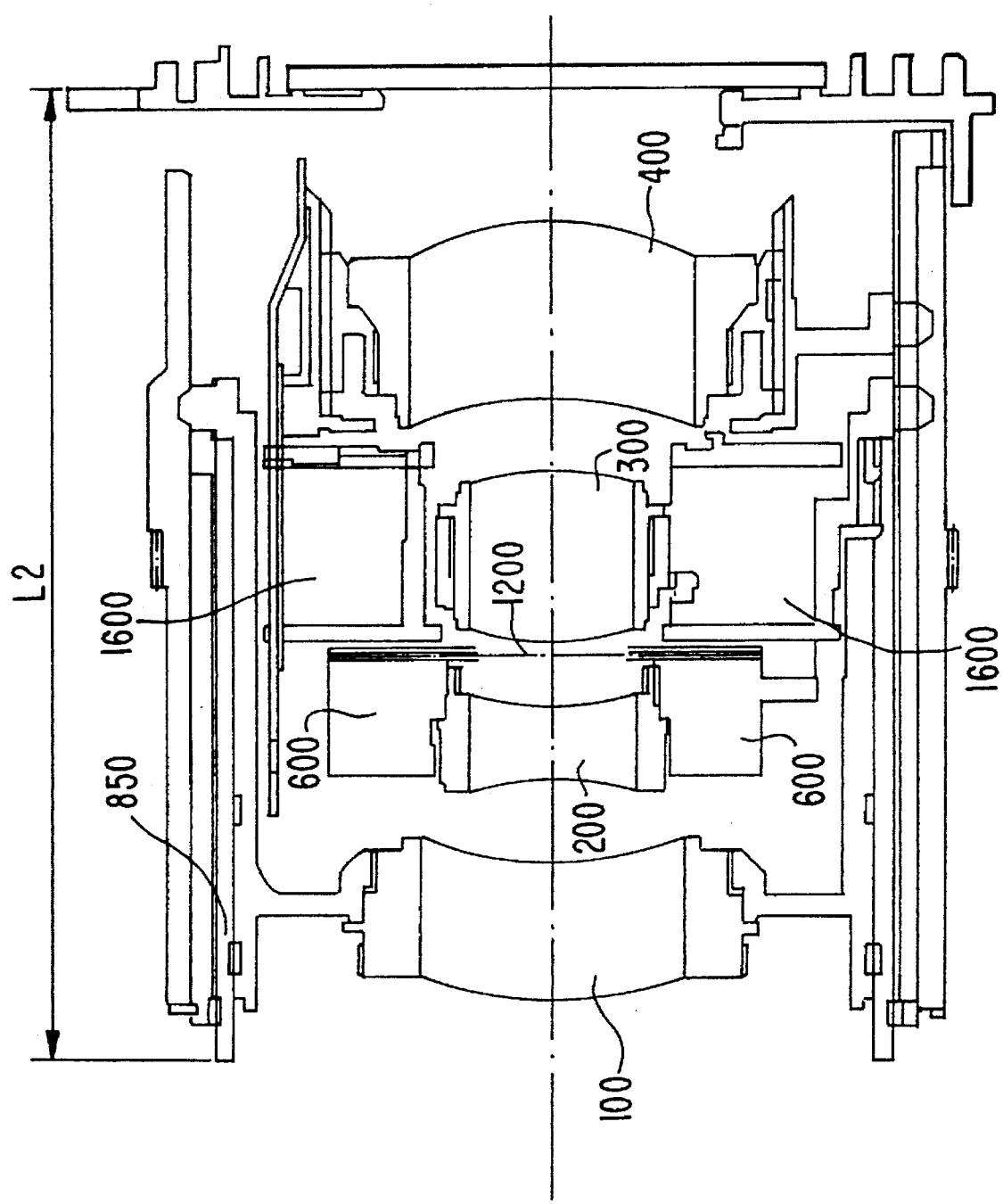
FIG. 7 is a cross sectional view showing a lens barrel of a camera having a hand tremor correction mechanism, the lens barrel being in a wide angle position.
Figure 8:
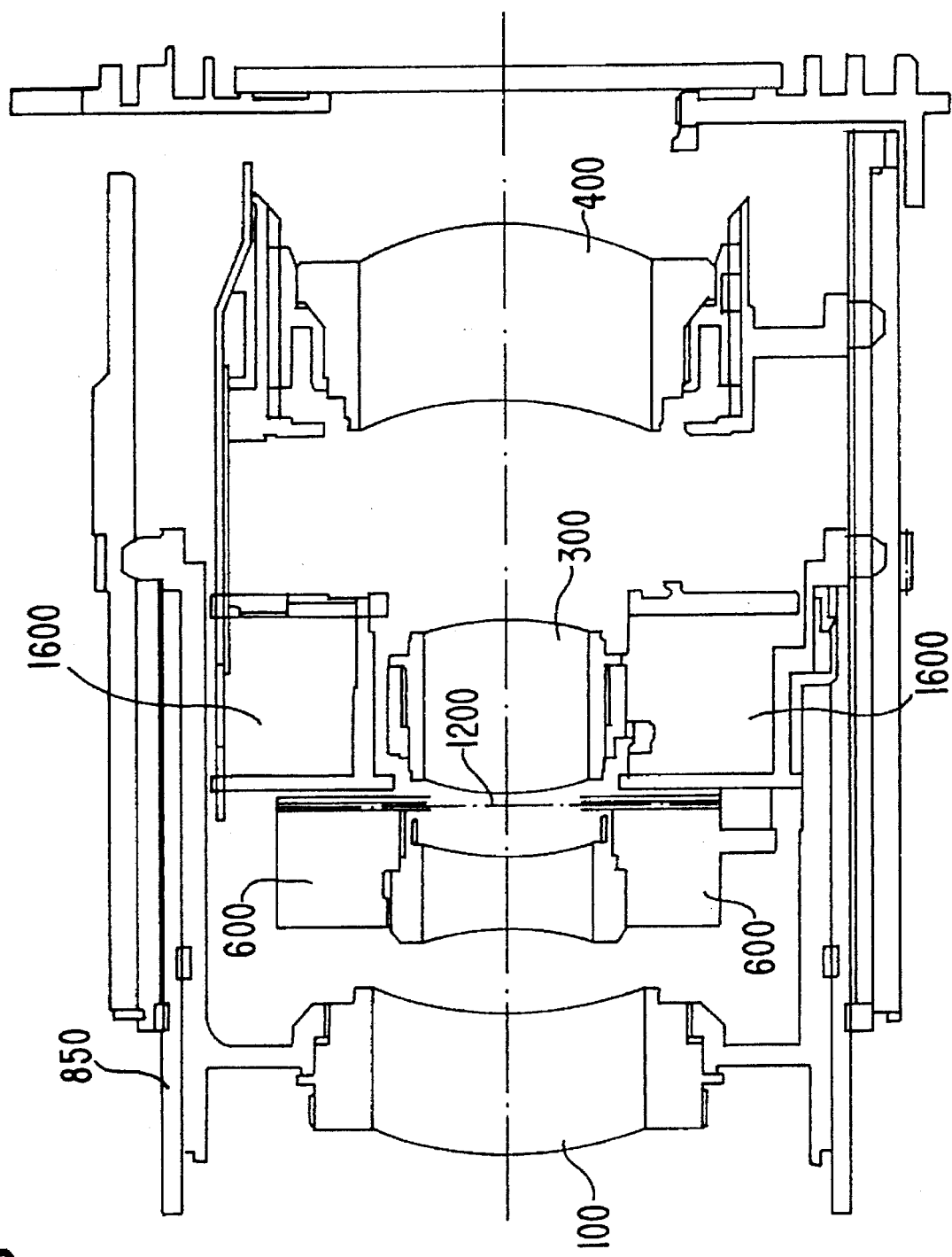
FIG. 8 is a cross sectional view showing a lens barrel of a camera having a hand tremor correction device, the lens barrel being in a telephoto position.

FIGS. 7 and 8 are cross sectional views showing a photographic lens barrel 850 of a camera having a hand tremor correction mechanism. Photographic lens barrel 850 is capable of "zoom" movement between a wide angle position where photographic lens barrel 850 is retracted, as shown in FIG. 7, and a telephoto position where photographic lens barrel 850 is fully extended, as shown in FIG. 8. FIGS. 7 and 8 also illustrate a shutter sector 1200 and a shutter drive mechanism 600 for the camera. The camera also includes four photographic lens groups 100, 200, 300 and 400 which together form a photographic optical system. Photographic lens group 400 functions as a focusing lens. Photographic lens group 300 (hereinafter referred to as "correcting lens 300") functions as a correcting lens to compensate for vibrational effects, such as from hand tremors, by shifting in a direction orthogonal to the optical axis. A drive mechanism 1600 operates to drive correcting lens 300 and is located on an external circumferential portion of correcting lens 300.

Angular velocity sensors (not illustrated) detect vibrations and output corresponding signals. Control circuits (not illustrated) are arranged within the camera and receive the output signals of the angular velocity sensors. Based on the signals output from the angular velocity sensors, the control circuits operate drive mechanism 1600 to shift correcting lens 300 at the same time shutter sector 1200 is released. Correcting lens 300 is shifted in a direction orthogonal to the optical axis by an amount corresponding to the amount of vibration. In this manner, the effects of vibration are reduced.

Nevertheless, in the hand tremor correction mechanism shown in FIGS. 7 and 8, the thickness (or width) of drive mechanism 1600 in the optical axis direction is greater than the thickness of the correcting lens 300 in the optical axis direction. Therefore, the right-hand side (as shown in FIGS. 7 and 8) of drive mechanism 1600 extends further in the optical axis direction than the right-hand side of correcting lens 300 when the left-hand side of drive mechanism 1600 and the left-hand side of correcting lens 300 are both at about in the same position along the optical axis. As a result, as can be seen in FIG. 7, the space between correcting lens 300 and photographic lens group 400 is governed by the right-hand side of drive mechanism 1600. With the lens barrel illustrated in FIG. 7, the space between the correcting lens 300 and photographic lens group 400 cannot be reduced any further.

Therefore, in order to allow sufficient movement of correcting lens 300 and photographic lens group 400, the length L2 (see FIG. 7) of photographic lens barrel 850 must be increased, thereby increasing camera size and cost. Also, the diameter of correcting lens 300 is large, thereby causing photographic lens barrel 850 to be large and costly.

Figure 9:
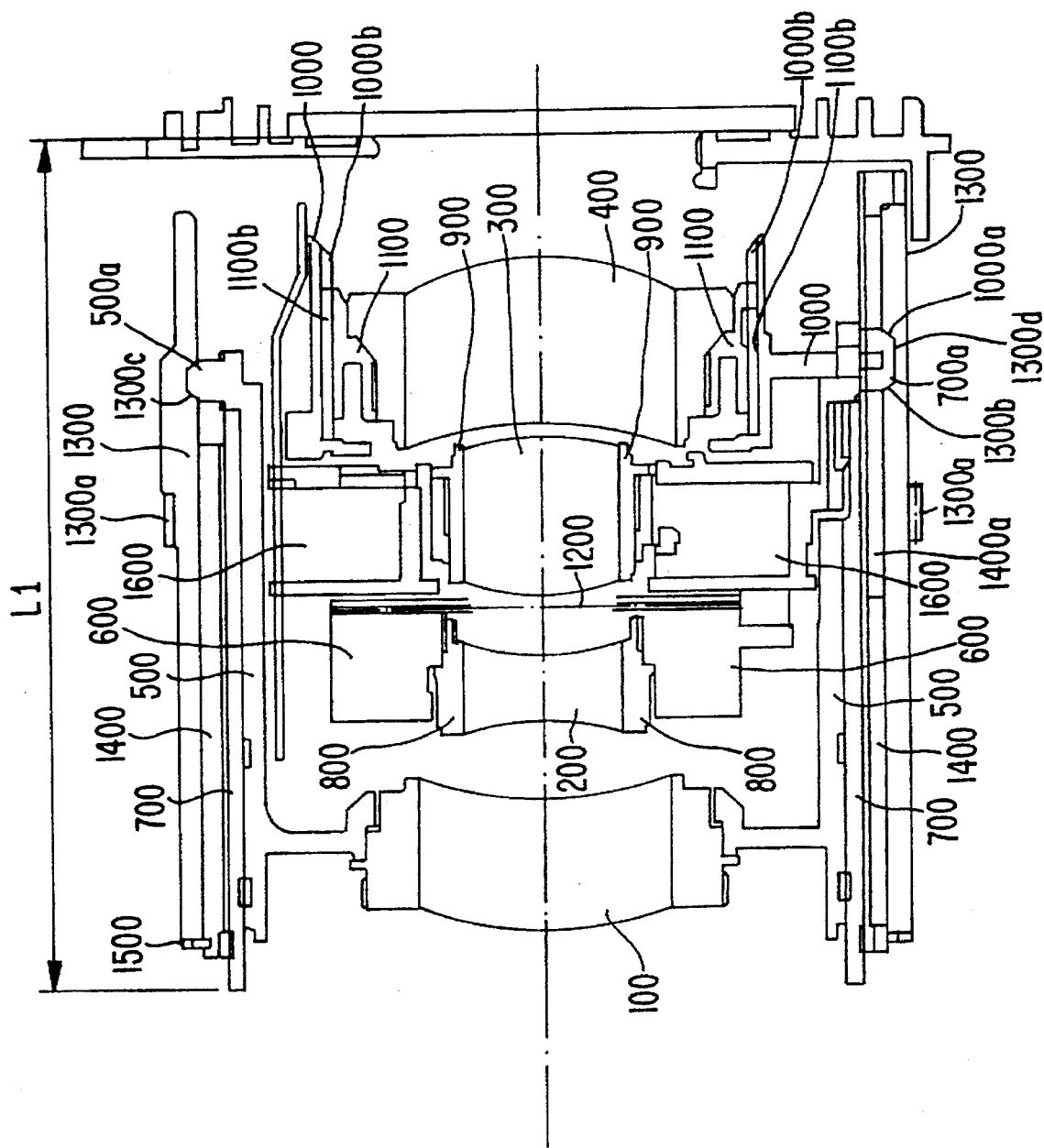
FIG. 9 is a cross sectional view showing a lens barrel of a camera having a hand tremor correction mechanism according to an embodiment of the present invention, the lens barrel being in a wide angle position.
Figure 10:
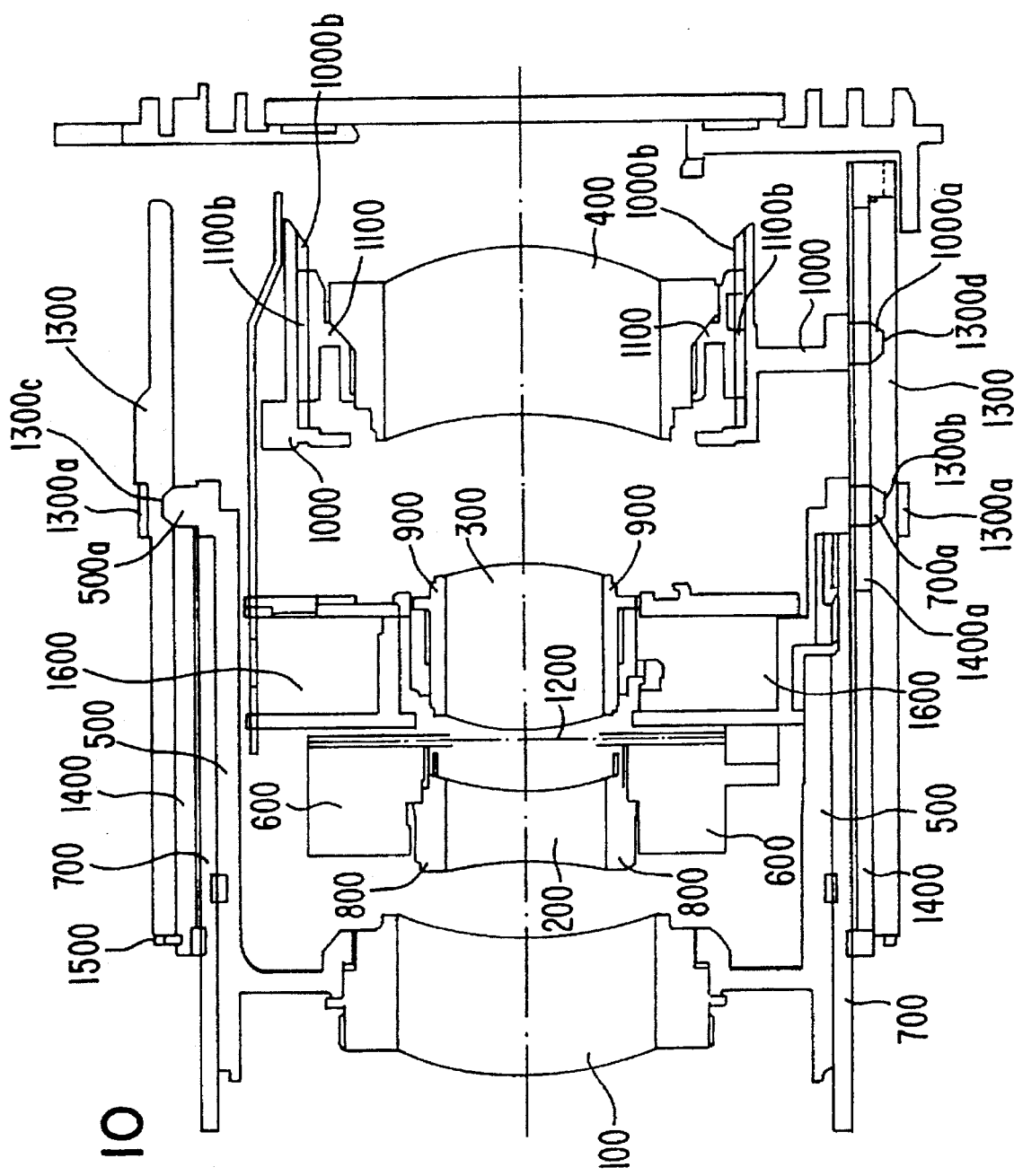
FIG. 10 is a cross sectional view of a camera having a hand tremor correction mechanism according to an embodiment of the present invention, the lens barrel being in a telephoto position.

FIGS. 9 and 10 are cross-sectional views showing a photographic lens barrel 1400 of a camera having a hand tremor correction mechanism according to an additional embodiment of the present invention, photographic lens barrel 1400 being in a wide angle position in FIG. 9 and being in a telephoto position in FIG. 10.

Referring now to FIGS. 9 and 10, photographic lens barrel 1400 is fixed to the camera body. Photographic lens barrel 1400 includes photographic lens groups 100, 200 and 400 and correcting lens 300. Photographic lens group 400 acts as a focusing lens. A rectilinear groove 1400a is formed in the optical axis direction in the circumferential surface of photographic lens barrel 1400. A rotatable cam tube 1300 is positioned on the external circumferential surface of photographic lens barrel 1400 and is prevented from being removed off by a ring 1500. The rotation of the output shaft of a zooming motor (not illustrated) is transmitted to a gear portion 1300a formed in the external circumferential surface of cam tube 1300, thereby rotating cam tube 1300.

Cam grooves 1300b, 1300c and 1300d are formed in the circumferential surface of cam tube 1300 and cooperate with cam followers (described later). A lens baseplate 700 is inserted through the internal circumferential surface of photographic lens barrel 1400. A correcting lens 300 and a drive mechanism 1600 are supported on lens baseplate 700. Drive mechanism 1600 drives correcting lens 300. Drive mechanism functions as a hand tremor correction mechanism or a vibration correction mechanism. A lens holder 900 holds correcting lens 300.

A lens shutter mechanism is integrally mounted in the hand tremor correcting device. The lens shutter mechanism comprises a shutter sector 1200, which also acts as a stop, integrated with a shutter drive mechanism 600 to drive shutter sector 1200. Shutter drive mechanism 600 is, for example, attached to lens baseplate 700 such as by screws (not illustrated). Moreover, shutter drive mechanism 600 supports photographic lens group 200 via a lens holder 800. A cam follower 700a, located on lens baseplate 700, passes through rectilinear groove 1400a and cooperates with cam groove 1300b.

A lens holder 500 is inserted in the internal circumferential surface of lens baseplate 700 to support photographic lens group 100. A cam follower 500a, located on the internal circumferential surface of lens holder 500, cooperates with cam groove 1300c. Lens holder 500 is capable of sliding in the optical axis direction relative to lens baseplate 700; however, rotation of lens holder 500 together with lens baseplate 700 is prevented.

A lens baseplate 1000, with a helicoid 1000b formed in its internal circumferential surface, is inserted near the rear portion of photographic lens barrel 1400. A cam follower 1000a, located on the external circumferential surface of lens baseplate 1000, passes through rectilinear groove 1400a and cooperates with cam groove 1300d. Lens holder 1100 supports photographic lens group 400. A helicoid 1100b formed in the external circumferential surface of lens holder 1100 is in threaded engagement with helicoid 1000b. When lens holder 1100 is rotated by the rotation of a focusing motor (not illustrated), lens holder 1100 is driven in the optical axis direction by the action of the helicoids 1000b and 1100b. In this manner, focusing lens 400, while rotating, moves in the optical axis direction so that focusing is performed.

Cam tube 1300 rotates according to a zoom motor (not illustrated). When cam tube 1300 rotates, cam grooves 1300b, 1300c and 1300d move and each cam follower 500a, 700a and 1000a is driven in the optical axis direction. As a result, lens holder 500 (supporting photographic lens group 100), lens baseplate 700 (supporting photographic lens group 200 and correcting lens 300), and baseplate 1000 (supporting photographic lens group 400) are driven in the optical axis direction and zooming is performed between the wide angle position shown in FIG. 9 and the telephoto position shown in FIG. 10.

Figure 11:
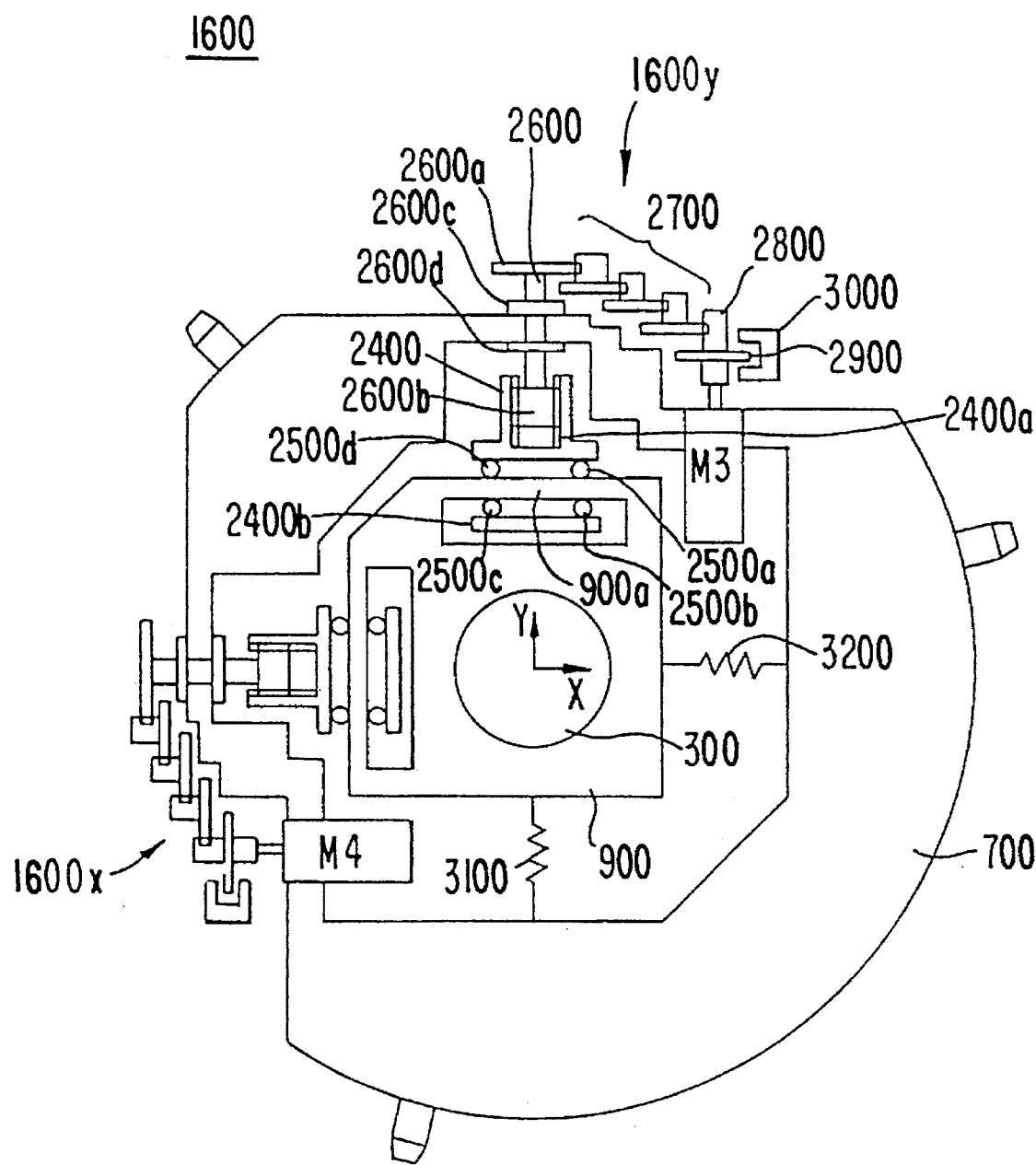
FIG. 11 is a diagram illustrating a correcting lens drive mechanism according to an embodiment of the present invention.

FIG. 11 is a diagram illustrating a correcting lens drive mechanism according to an embodiment of the present invention.

Referring now to FIG. 11, correcting lens drive mechanism 1600, which operates as a vibration correction mechanism, includes an X-direction drive mechanism 1600x which drives correcting lens 300 in the X direction and a Y-direction drive mechanism 1600y which drives correcting lens 300 in the Y direction. The X direction and the Y direction are both orthogonal to the optical axis of the photographic optical system.

The Y-direction drive mechanism 1600y has a Y-direction motor M3. A gear 2800 rotates integrally with an output shaft of motor M3. A reduction gear train 2700 reduces the speed of gear 2800. A Y-direction shift drive shaft 2600 connects to reduction gear train 2700 and a Y-direction drive arm 2400 converts the rotation of drive shaft 2600 into rectilinear motion. The Y-direction shift drive shaft 2600 is rotatably supported on lens baseplate 700 as a shaft by a pair of flanges 2600c and 2600d. The final gear of reduction gear train 2700 is connected to the upper portion of gear 2600a to engage gear 2600a. In addition, a male threaded portion 2600b is formed on the lower portion of drive shaft 2600. Y-direction drive arm 2400 is non-rotatably supported and is able to move up and down in a space formed in lens baseplate 700. A female threaded portion 2400a formed on the upper portion Y-direction drive arm 2400 is in threaded engagement with the male threaded portion 2600b of the drive shaft 2600.

A captive portion 2400b is formed at the lower end of Y-direction drive arm 2400. The upper connection portion 900a of lens holder 900 is maintained in an inserted position by captive portion 2400b via four slide balls 2500a–2500d. Accordingly, due to the rise and fall of Y-direction drive arm 2400, the lens holder 900 and correcting lens 300 are shifted in the Y direction. The amount of shift depends on the amount of rotation of motor M3. The X-direction drive mechanism 1600x shifts correcting lens 300 in the X direction via motor M4. The X-direction drive mechanism 1600x is constituted in a similar manner as Y-direction drive mechanism 1600y.

Correcting lens 300, shifted by Y-direction drive mechanism 1600y, is unrestricted relative to the X direction by the Y-direction drive mechanism 1600y. Moreover, correcting lens 300, shifted by X-direction drive mechanism 1600x, is unrestricted relative to the Y direction by the X direction drive mechanism 1600x. Accordingly, the correcting lens 300 is capable of being shifted in all directions orthogonal to the optical axis.

Moreover, the amount of shift of correcting lens 300 depends on the amount of rotation of motor M3. A photointerruptor 3000 detects the amount of rotation of motor M3. Springs 3100 and 3200 urge lens holder 900 towards Y-direction drive mechanism 1600y and X-direction drive mechanism 1600x, respectively.

As shown in FIG. 9, the thickness or width of drive mechanism 1600 in the optical axis direction is smaller than the thickness or width of correcting lens 300 in the optical axis direction. Accordingly, as illustrated in FIG. 9, the right-hand side of drive mechanism 1600 does not hinder the positional relationship of the right-hand side of correcting lens 300 in relation to the left hand side of focusing lens 400 when the left-hand surface of drive mechanism 1600 and the left-hand surface of correcting lens 300 are both in approximately the same position along the optical axis. Accordingly, the right-hand side of drive mechanism 1600 can be moved closer to the left-hand side of focusing lens 400 in relation to the right-hand side of correcting lens 300. As a result, in the wide angle position as shown in FIG. 9, correcting lens 300 can be moved close to the vicinity of focusing lens 400 without drive mechanism 1600 causing an obstruction. As a result, the length L1 of photographic lens barrel 1400 can be shortened in comparison with the length L2 of the photographic lens barrel in FIG. 7.

The preferred embodiment of the present invention illustrates a case in which zooming is used in a camera. However, the present invention could also be applied to other types of cameras, such as a single focus lens camera. By having a smaller thickness of the drive mechanism in the optical axis direction than the thickness of the correcting lens in the optical axis direction, the surface on at least one side of the drive mechanism can be moved so as not to obstruct the surface on one side of the correcting lens in the optical axis direction. As a result, a position of the correcting lens system can be set in the optical axis direction such that the drive mechanism is not obstructed.

Also, the above embodiment of the present invention describes a camera having a shutter which is integral with the photographic lens barrel. However, for example, the present invention can also be applied to an interchangeable lens barrel disposed in a single lens reflex camera.

Moreover, since the thickness of the drive mechanism in the optical axis direction is less than the thickness of the correcting lens in the optical axis direction, the position of the correcting lens can be set in the direction of the optical axis without obstructing the drive mechanism and the length of the body of the lens barrel can be made shorter.

The above embodiments of the present invention are also described for a camera having a hand tremor correction mechanism. However, it is understood that the present invention can be applied to vibration correction mechanisms for photographic optical systems wherein image correction is made for vibration that can be caused by sources other than hand tremors, such as by machine vibration if the photographic optical system was attached to or integrated with manufacturing assembly equipment.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera comprising:
   a photographic lens which has an external periphery and moves along the optical axis of the camera;
   a flexible printed circuit board;
   a vibration detection unit which detects camera vibration and produces a corresponding output signal;
   a vibration correction mechanism, coupled to the external periphery of the photographic lens and electrically connected to the vibration detection unit via the flexible printed circuit board, which receives the output signal of the vibration detection unit via the flexible printed circuit board and compensates for the vibration detected by the vibration detection unit.

2. A camera as in claim 1, wherein the external periphery of the photographic lens is an external circumference.

3. A camera as in claim 1, further comprising at least two photographic lenses which move along the optical axis, each photographic lens having an external periphery which is an external circumference, wherein the vibration correction mechanism is coupled to the external circumference of the photographic lens having the smallest diameter.

4. A camera as in claim 1, wherein the vibration correction mechanism compensates for vibration by shifting the photographic lens in a direction which is perpendicular to the optical axis.

5. A camera as in claim 3, wherein the vibration correction mechanism compensates for vibration by shifting the photographic lens to which the vibration correction mechanism is coupled in a direction perpendicular to the optical axis.

6. A camera as in claim 1, wherein the vibration correction mechanism and the photographic lens each have a thickness in the optical axis direction, the thickness of the vibration correction mechanism in the optical axis direction is equal to or less than the thickness of the photographic lens in the optical axis direction.

7. A camera as in claim 3, wherein the vibration correction mechanism and the photographic lens to which the vibration correction mechanism is coupled each have a thickness in the optical axis direction, the thickness of the vibration correction mechanism in the optical axis direction is equal to or less than the thickness of the photographic lens in the optical axis direction.

8. A photographic optical system comprising:
   a photographic lens having an external periphery and a thickness in the optical axis direction of the photographic optical system;
   a vibration correction mechanism which is coupled to the external periphery of the photographic lens and shifts the photographic lens to compensate for the effects of photographic optical system vibration, the vibration correction mechanism having a thickness in the optical axis direction which is less than or equal to the thickness of the photographic lens in the optical axis direction.

9. A photographic lens barrel comprising:
   a photographic lens having an external periphery and a thickness in the optical axis direction of the photographic lens barrel;
   a vibration correction mechanism which is coupled to the external periphery of the photographic lens and shifts the photographic lens to compensate for the effects of photographic lens barrel vibration, the vibration correction mechanism having a thickness in the optical axis direction which is less than or equal to the thickness of the photographic lens in the optical axis direction.

10. A photographic lens barrel as in claim 9, for use with a camera having a camera body and wherein the photographic lens barrel is attachable and detachable from the camera body.

11. An image forming optical system comprising:
    a lens having an external periphery and a thickness in the optical axis direction of the image forming optical system;
    a vibration correction mechanism which is coupled to the external periphery of the lens and shifts the lens to compensate for the effects of vibration, the vibration correction mechanism having a thickness in the optical axis direction which is less than or equal to the thickness of the lens in the optical axis direction.

* * * * *